United States Patent [19]
Johnson et al.

[11] Patent Number: 5,698,066
[45] Date of Patent: Dec. 16, 1997

[54] BAND FIBER FORMING AND PLACEMENT DELIVERY HEAD

[75] Inventors: John A. Johnson, Magna; Noel L. Shepherd, Grantsville; Keith G. Shupe, Bountiful; James P. Nielsen, West Valley City, all of Utah

[73] Assignee: Alliant Techsystems Inc., Hopkins, Minn.

[21] Appl. No.: 924,355

[22] Filed: Aug. 3, 1992

Related U.S. Application Data

[63] Continuation of Ser. No. 630,149, Dec. 19, 1990, abandoned.

[51] Int. Cl.$^6$ .................................................. B65H 81/00
[52] U.S. Cl. ...................... 156/441; 156/353; 156/359; 156/361; 156/433; 156/498; 156/499; 156/522; 156/523; 156/574
[58] Field of Search ............................. 156/359, 353, 156/361, 425, 173, 433, 574, 523, 522, 441, 498, 499

[56] References Cited

U.S. PATENT DOCUMENTS

| | | |
|---|---|---|
| 2,596,162 | 5/1952 | Muskat . |
| 2,683,105 | 7/1954 | Forbes et al. . |
| 3,025,205 | 3/1962 | Young . |
| 3,148,102 | 9/1964 | Eakins et al. ............. 156/173 X |
| 3,313,670 | 4/1967 | Sherwood ................... 156/359 |

(List continued on next page.)

FOREIGN PATENT DOCUMENTS

| | | |
|---|---|---|
| 0198744 | 3/1986 | European Pat. Off. . |
| 0370507 | 11/1989 | European Pat. Off. . |
| 2579130 | 9/1986 | France . |
| 3223231 | 6/1982 | Germany . |
| 3226290 | 7/1982 | Germany . |
| 61-160836 | 7/1986 | Japan . |
| 9007428 | 7/1990 | WIPO . |

OTHER PUBLICATIONS

Milacron Today, "Fiber Placement: Automating Complex Composite Parts Processing", vol. 4, No. 6 (Jun. 1989).
The Ingersoll brochure entitled "Automated Machinery for Composite Manufacturing", 1989.
Evans et al., "Fiber Placement Process Study", Tomorrow's Materials: Today, SAMPE, vol. 34–II, pp. 1822–1833, May 8–11, 1989.
W. B. Goldsworthy, in *N/C Tape Laying –Tomorrow's Future Today*, Western Metal & Tools Conf. Soc. of Manf. Engineers, Mar. 11–15, 1974.
L. A. Williams, III in *Contoured Tape Laying*, Engineered Materials Handbook, vol. I; *Composites* pp. 631–635, AMS Intnl., Metals Park, OH, 1987.
Cincinnati Milacron/General Dynamics, *Tape Laying*.
W. O. Sunafrank et al., "*Development of Composite Tape Laying Process for Advanced Fibrous Reinforced Composite Structures*", Mar. 1971.
Hercules Incorporated, *Fiber Placement, the Key Technology for Affordable High Performance Structures*, Jan. 1990.
D. V. Rosato et al., "Filament Winding: its development, manufacture, applications, and design", pp. 103–109 (Interscience Publishers 1964).
M. E. Rosheim, "A New Pitch–Yaw–Roll Mechanical Robot Wrist Activator", Jun. 1985, Society Of Manufacturing Engineers, vol. 2.
R. Merritt, "Industrial Robots: Getting Smarter All the Time", Instruments & Control Systems, p. 32 (Jul. 1982).
Grimshaw et al., "Automated Tape Layup of a BMI Vertical Stabilizer Skin", 15–17 Sep. 1987, pp. 173–182.
Klein, Allen J., "Automated Tape Laying", *Advanced Composites*, Jan/Feb. 1989, pp. 44–52.
Cincinnati Milacron, "Into The Future... With Better Ways to Automate the the Manufacture of Composite Parts", 1988.

*Primary Examiner*—Jeff H. Aftergut
*Attorney, Agent, or Firm*—Mark Goldberg, Esq.

[57] ABSTRACT

A delivery head assembly is provided for forming a tape band from a plurality of tows and applying the band as superimposed layers in a helical pattern on to a mandrel to produce non-uniform cross sectional articles. This head assembly is composed of a distribution section, ribbonizing section, coating section, add section, and compaction roller.

10 Claims, 6 Drawing Sheets

U.S. PATENT DOCUMENTS

| | | |
|---|---|---|
| 3,574,040 | 4/1971 | Chitwood et al. . |
| 3,616,070 | 10/1971 | Lemelson . |
| 3,616,078 | 10/1971 | Howard . |
| 3,694,927 | 10/1972 | Sorenson . |
| 3,723,157 | 3/1973 | Durin . |
| 3,737,352 | 6/1973 | Avis et al. . |
| 3,775,219 | 11/1973 | Karlson et al. . |
| 3,819,461 | 6/1974 | Saffadi . |
| 3,970,831 | 7/1976 | Hegyi . |
| 4,145,740 | 3/1979 | McClean et al. . |
| 4,168,194 | 9/1979 | Stiles . |
| 4,221,619 | 9/1980 | Lemons . |
| 4,292,108 | 9/1981 | Weiss et al. . |
| 4,351,688 | 9/1982 | Weiss . |
| 4,382,836 | 5/1983 | Frank . |
| 4,461,669 | 7/1984 | Dontschef . |
| 4,508,584 | 4/1985 | Charles . |
| 4,531,998 | 7/1985 | Peterson . |
| 4,557,790 | 12/1985 | Wisbey . |
| 4,569,716 | 2/1986 | Pugh . |
| 4,591,402 | 5/1986 | Evans et al. . |
| 4,610,402 | 9/1986 | Corbett et al. ............... 156/425 X |
| 4,699,683 | 10/1987 | McCowin . |
| 4,790,898 | 12/1988 | Woods . |
| 4,797,172 | 1/1989 | Hebert et al. . |
| 4,799,981 | 1/1989 | Stone et al. . |
| 4,822,444 | 4/1989 | Weingart et al. . |
| 4,867,834 | 9/1989 | Alenskis et al. . |
| 4,872,619 | 10/1989 | Vaniglia . |
| 4,877,193 | 10/1989 | Vaniglia . |
| 4,877,471 | 10/1989 | McCowin et al. . |
| 4,907,754 | 3/1990 | Vaniglia . |
| 4,943,338 | 7/1990 | Wisbey . |
| 4,997,503 | 3/1991 | Bohannan et al. ............ 156/173 X |
| 5,015,326 | 5/1991 | Frank . |
| 5,022,952 | 6/1991 | Vaniglia . |
| 5,045,147 | 9/1991 | Benson et al. ................. 156/433 X |
| 5,078,592 | 1/1992 | Grimshaw et al. . |
| 5,104,474 | 4/1992 | Scola et al. . |
| 5,110,395 | 5/1992 | Vaniglia ........................ 156/425 X | ness
BAND FIBER FORMING AND PLACEMENT DELIVERY HEAD

This application is a continuation of application Ser. No. 07/630,149, filed Dec. 19, 1990, now abandonded.

BACKGROUND OF THE INVENTION

This invention relates to fiber placement devices that apply superimposed layers of fibrous rovings or tows, impregnated with a thermosetting resin, in a helical pattern onto a mandrel to produce a generally tubular article having varying contours.

In most types of filament winding operations, the tows pass through an aperture (a "delivery eye") or from a delivery roller across an air space onto the part. This type of system is limited to geodesic-path or natural-path fiber patterns and the roving need to remain continuous. Therefore, a turnaround dome is required in the scrap area of the workpiece. Any compaction of the part is a result of the tension induced on the roving while the part is being manufactured.

Conventional tape laying devices generally provide positioning of bands on flat or slightly contoured surfaces; these systems cannot wind non-geodesic paths without fiber gaps or overlaps unless an impracticably narrow band of tows is employed.

The inability to cut the band during laying down of composite material making it necessary to have a turnaround dome on the mandrel, to be limited to the use of geodesic paths, and to use roving induced tension, result in a limited system that would be costly to operate. The inability to accurately place fiber at the optimum angle results in heavier than necessary designs. In some cases this results in a design that cannot be automated or is less costly and no heavier if designed in metal and therefore subject to other disadvantages.

U.S. Pat. No. 4,822,444 discloses a filament winding method that overcomes those disadvantages of known methods, but this method involves a device in which the multiple rovings are tensioned, flattened, and guided into a "shingled" or slightly overlapped relationship as they are applied to the rotating mandrel; as the shingled rovings are placed on the mandrel, a continuous thermoplastic tape or paper strip is applied to the rovings' upper surface between the rovings and payoff roller to maintain their overlapped position integrity and to prevent sticking to the payoff roller while being applied to the mandrel. U.S. Pat. No. 4,867,834 also discloses a filament winding method that overcomes the above mentioned disadvantages of known methods, but this method adds individual tows without shaping and forming a tape. U.S. Pat. No. 4,790,898 also discloses a filament winding method where the tows are flattened and formed into a tape on the mandrel by applying sufficient compression force to the tows by the compaction roller while heating the tows with a hot air gun; this system also uses a pair of rotating shear blades, one on each side of the plurality of tows, to cut individual tows prior to forming the tape on the mandrel.

There is a need for a compact delivery head to improve prior art devices so as to permit the head to make a quality tape band from a plurality of tows with reliable cutting of such band using a single cutting mechanism and adding it back on demand, thus eliminating excessive scraps associated with tape laying.

SUMMARY OF THE INVENTION

This invention is directed to a delivery head assembly for a fiber placement machine, having an input end for fibrous tows and an output end for applying superimposed layers of the tows in the form of a band in a helical pattern onto a mandrel to produce a generally tubular article having varying contours. The delivery head assembly comprises:

a) distributing means being located at said input end of the assembly for receiving and spacing the tows in a single plane and passing the tows inwardly in said assembly, b) ribbonizing means for spreading the tows to a desired width and thickness by heating and applying pressure, thus forming a quality tape band, c) chilling means for cooling the tape band coming from the ribbonizing means, d) cutting means for cutting the complete tape in a single action while the head is in motion, e) add means upstream from said cutting means for holding said cut tape band and adding on demand to permit the application of tape band to the mandrel where desired, and f) compaction roller means for applying superimposed layers of the tape band onto a mandrel.

DESCRIPTION OF THE PREFERRED EMBODIMENT

Figure 1:
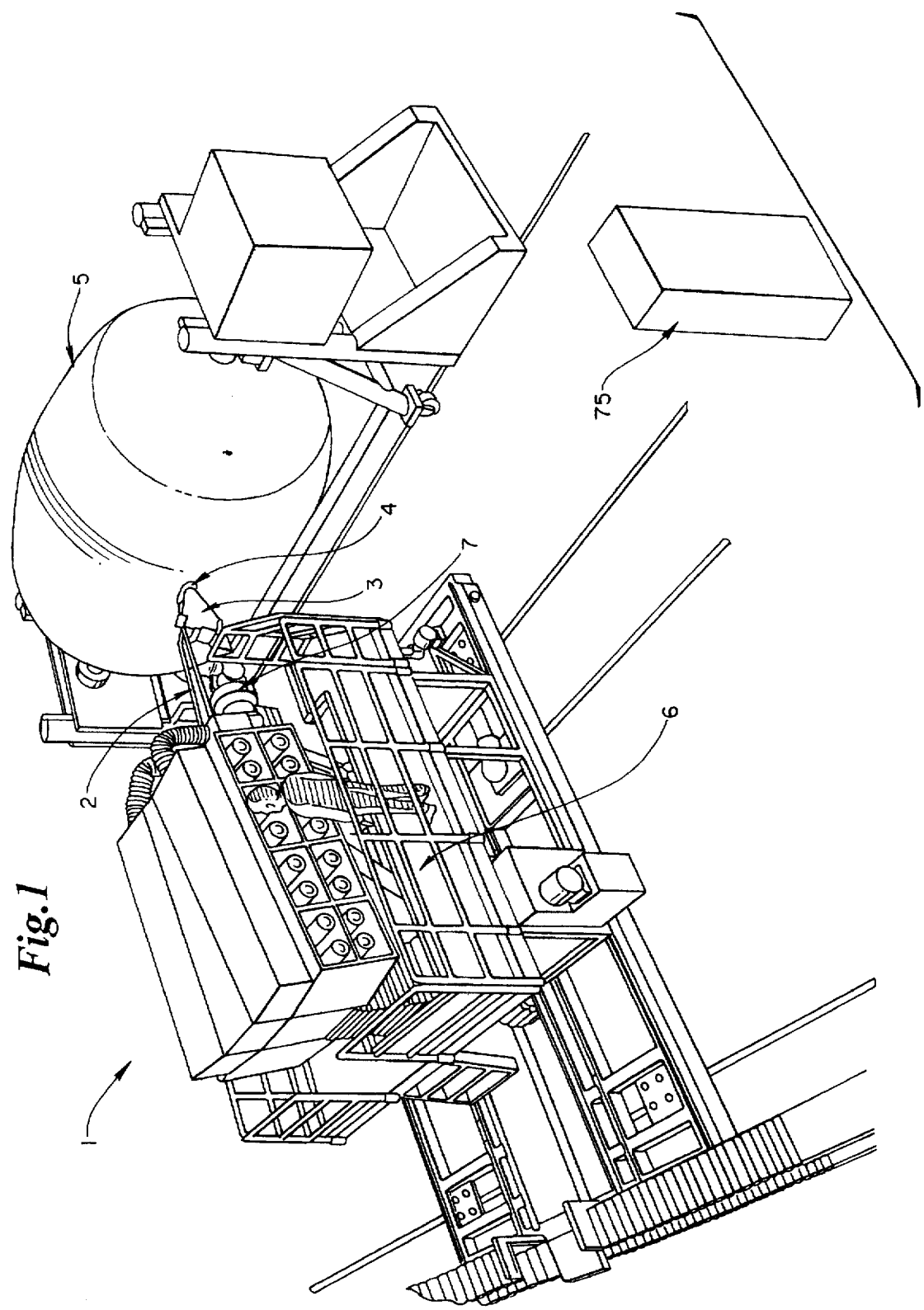
FIG. 1 is a perspective view showing the various components of the fiber placement system associated with this invention.

This invention is a delivery head (or end effector) for use in a completely computerized system for laying down composites on mandrels that are not necessarily symmetrical or flat but rather can include concave or convex contours.

On the instant delivery head, one or a plurality of tows can be processed into a band or tape for compaction on a mandrel in a manner similar to that used by tape laying machines. Since the band or tape is made up of a plurality of tows, the tows can be fed to the delivery head at different rates allowing the band to be placed on a curved path, without significant buckling. This feature makes it possible to lay down composites on a wide variety of mandrel shapes as mentioned above. The mandrel can be either stationary or rotated depending on the nature of the workpiece.

In the fiber placement process of the instant invention, fiber tows are normally impregnated with a resin prior to using in the process. Hence, the temperature of the tows must be controlled during the process in order to keep the tackiness down and, more importantly, to stop the resin in the tows from advancing to a state of cure in the placement machine. In other words, if the temperature of the tows is not controlled, the tows could bind up the machine causing major delays in the placement process. Therefore, it is important to control the temperature of the tows during the placement process. The temperature of the tows in the delivery head is raised during ribbonizing to help in the shaping and forming into a band (or tape) of the tows; in this ribbonizing zone, the temperature should be maintained in the temperature range of 88° to 163° C. for best results. The temperature of the tows in the remainder of the delivery head is reduced (in a temperature range of −25° to +10° C.), for the purpose of keeping the resin in the tows from coming out and off the surface of the tows onto the contact surfaces of the components of the delivery head. The temperature, nevertheless, of the band at the nip point or compaction roller is raised to improve the band's tackiness so as to obtain better adherence of the band to the mandrel or the previous layer of composites.

The fiber roving or tows that have been pre-impregnated with thermoset resins are transported through the delivery head. Once the tows enter the delivery head they are re-directed to a single plane. The tows are spaced to establish a band width that is determined by the ply thickness that meets the design criteria. Once the band width is established, the tows are passed through the ribbonizers and a tape quality band is made. The band is then chilled to assist with further methods of the band handling.

A band cutting mechanism is in place to cut the band as required in the part design as well as an adding mechanism to add the band back into the system when it is required. These mechanisms work to cut and add on the fly (or while the machine is in operation) so time is not lost. Through the use of the cutting and adding mechanisms, the excessive scraps, normally produced in the lay down, are eliminated. Also, cut-outs in the design of the part can be accomplished as required.

The band is delivered onto the mandrel by way of a delivery roller. The delivery roller contacts the part surface and provides a compacting force as the fiber is placed. Through the use of the compaction force the band can be placed into negative contours and follow non-geodesic fiber paths. The band is guided around the surface of the compaction roller by means of a band biasing device that is a curved deflector that has a contour parallel to the compaction roller and offset from the compaction roller at a nominal clearance. The purpose of this device is to keep the band in a ready position for accurately positioning the band on demand for laying down in each sequential lay down pass.

As the band is layed down onto the mandrel, optionally, a heat source is provided at the point where the fiber is being placed so that the fiber being placed and the underlying fiber will stick together. This heating step also makes the fiber and resin (in and/or on the fiber) soft and compliant enough so that good consolidation of the layers will take place in the part, i.e., no air bubbles or areas of bridging will form. This heating step is referred to as "nip point heating" because it must be accomplished quickly in the region between the compaction roller and the mandrel where they are closest together yet with the least possibility of heating the composite so hot that it will cause an exothermic reaction, or have localized areas of cured resin. This nip point heating can be accomplished by any heating device where the temperature can accurately be controlled in a narrow area; heating devices such as an electrically powered air heater or laser jet heater can be used for this nip point heating.

All of the component parts of the delivery head (i.e., entry comb, band width adjusting comb, ribbonizing section, chilling section, cutter, add section and compaction roller section) of the instant invention can be in the form of modular components that can readily be removed and replaced in the head for servicing. A modular unit is held in place with a quick acting mechanism locking device such as cam lock. The modular units can be exchanged rapidly with a duplicate modular component with minimal down time using little effort.

For a more detailed and comprehensive illustration of the invention, the invention will be described in reference to the drawings.

FIG. 1 illustrates the various components of a fiber placement system 1 of the instant invention. As shown, the fiber tows winding band 2 passes through the delivery head 3 and is applied by a compaction roller 4 to a winding mandrel 5 that could be in various shapes, such as aircraft inlet ducts and shrouds. Roller 4 presses against mandrel 5 during operation of laying down the fiber band onto mandrel 5. The delivery head 3 is mounted directly to a fiber placement machine 6 through an arm and wrist assembly generally shown as 7. As shown in FIG. 1, a control computer 75 is also provided to control (in addition to the ultimate control of the entire system) the actions of cutting and adding of the fiber band 2 in the delivery head 3 and the multiple axes movement of the fiber placement machine 6.

Figure 2:
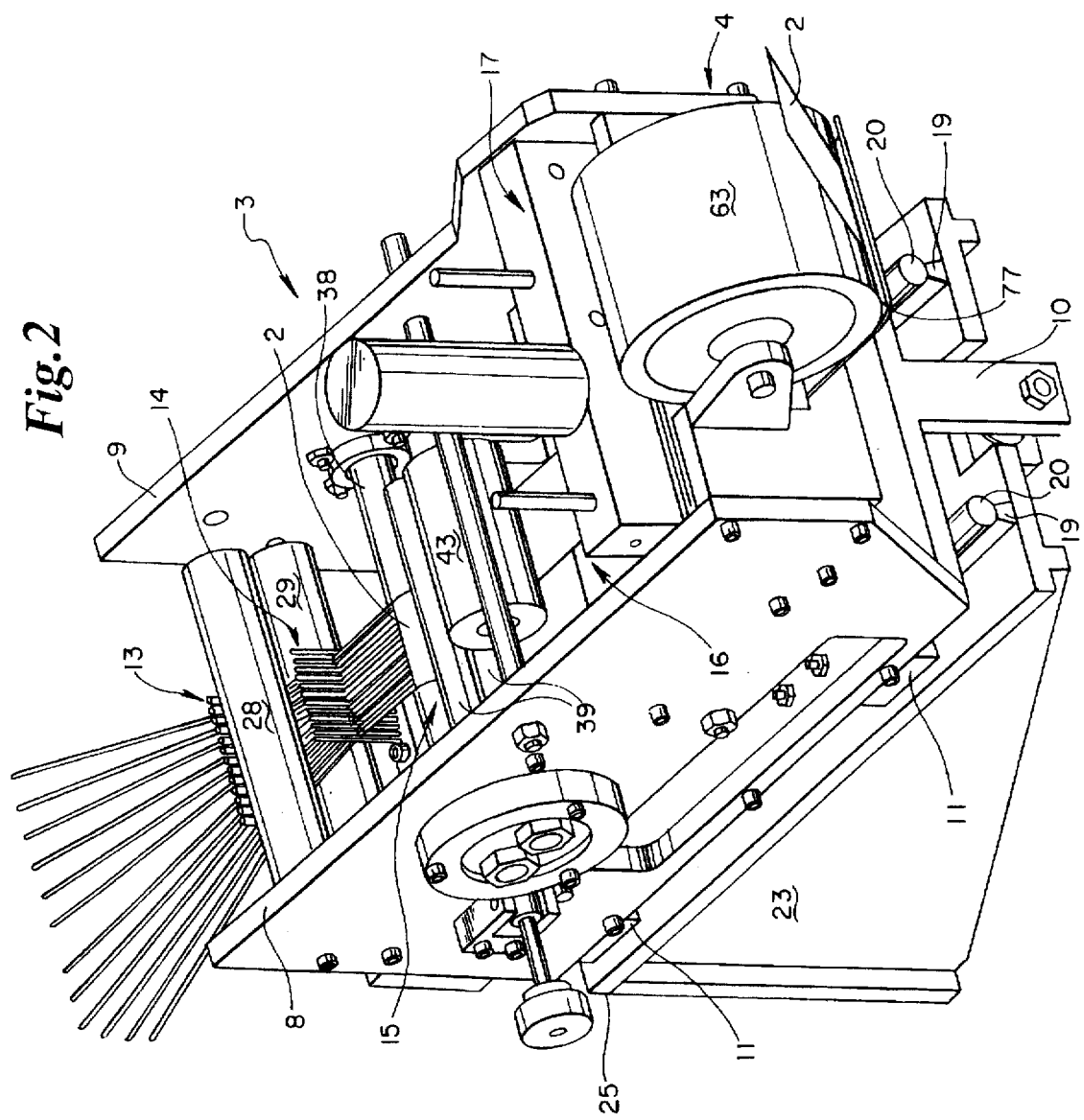
FIG. 2 is a front/side isometric projection view of the delivery head of this invention.
Figure 3:
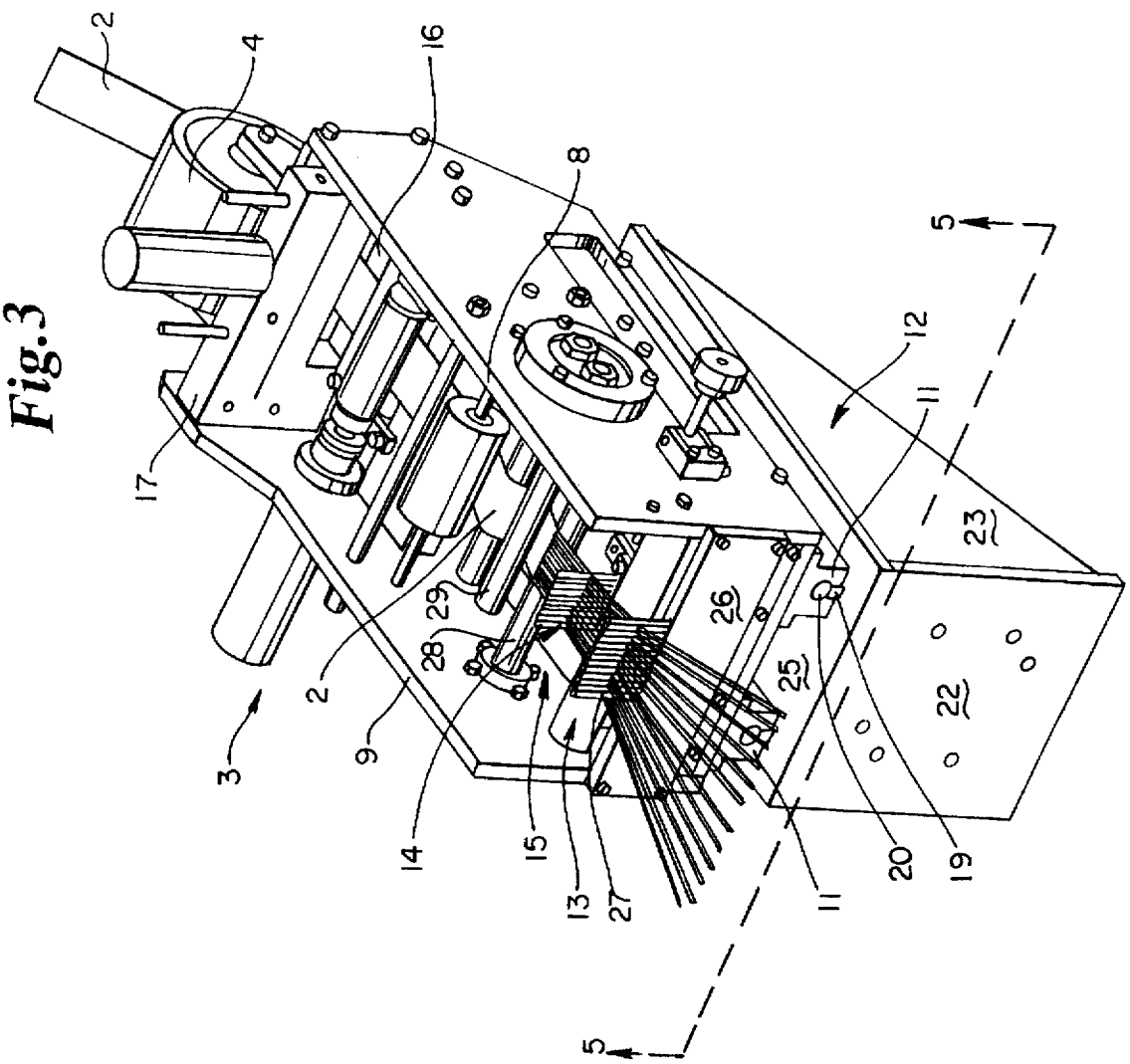
FIG. 3 is a rear/side isometric projection view of the delivery head of this invention.
Figure 4:
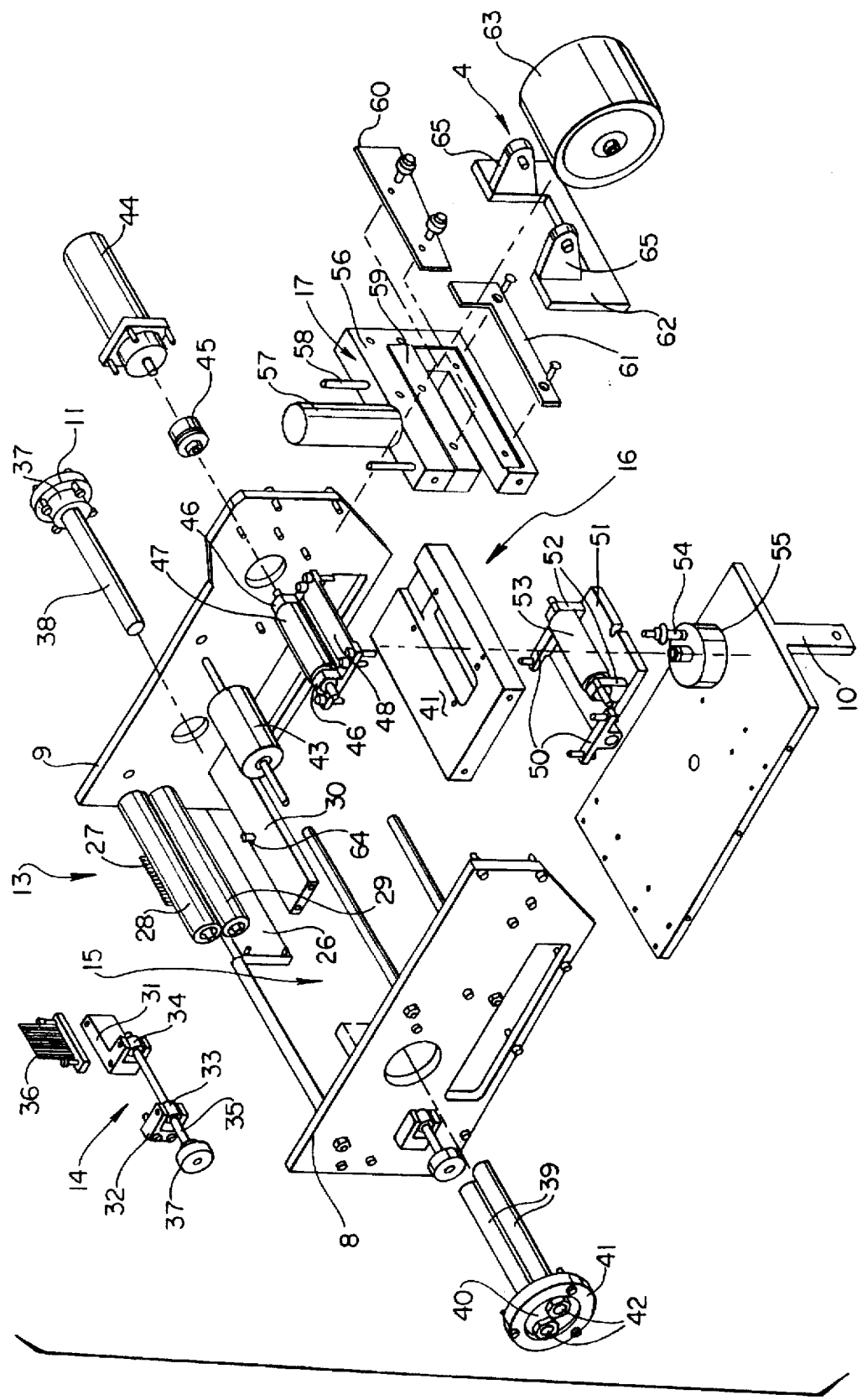
FIG. 4 is an exploded isometric projection view of FIG. 2 showing assembly.

FIG. 2 shows the several sections of the delivery head 3 through which the band 2 of fibers passes. The band 2 is composed of several individual tows. These tows are blended together to form the band. The sections 13, 14, 15, 16, 17, and 4 of the delivery head 3 are mounted to a housing formed by plates 8, 9 and 10. FIG. 3 shows the same components as mentioned above in FIG. 2 only from a rear view. FIG. 4 shows an exploded view with the components isolated in proximate location to their assembled disposition for a better view of the exact structure of each component.

Figure 5:
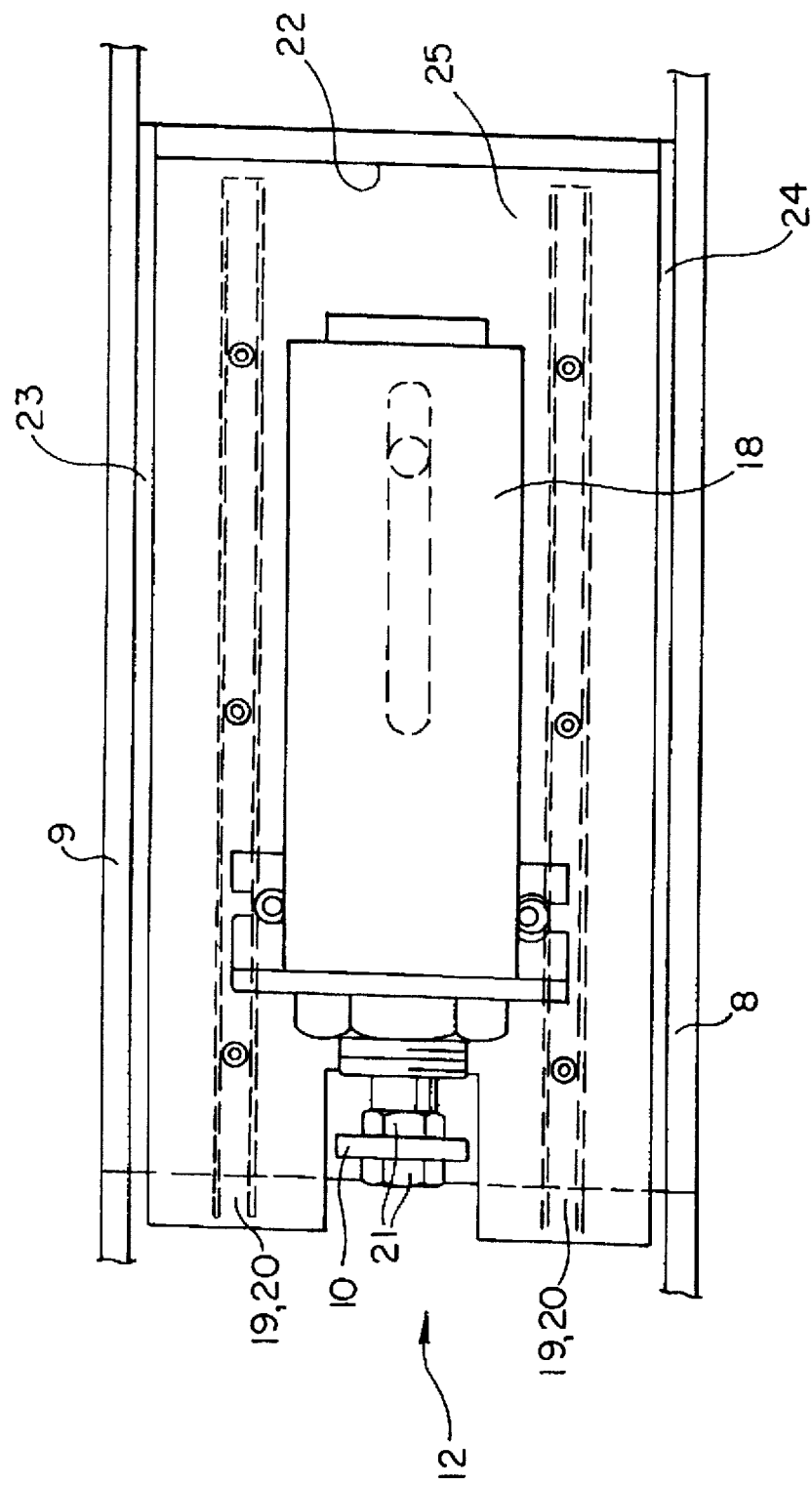
FIG. 5 is a bottom view showing the reciprocating mechanism for the delivery head along lines 5—5 as shown in FIG. 3.

FIG. 5 is the bottom view of the delivery head 3 as illustrated from lines 5—5 of FIG. 3 showing reciprocating mechanism 12. This mechanism 12 is responsible for the mounting of the delivery head 3 onto the fiber placement machine 6. It includes an attachment base plate 22, a left and right support gusset 23 and 24, and a top plate 25. These parts are assembled to form mounting platform 12 for holding delivery head 3 as shown in FIGS. 2 and 3. An air cylinder 18 is attached to the underneath side of the top plate 25 and supplies the compaction force, with the use of pressure regulators, and pulls the delivery head 3 off the mandrel 5 when required. The ram of the air cylinder 18 is attached to the base plate 10 of the delivery head 3 by the use of jam nuts 21. Ball rail support shafts 19 and ball rail shafts 20 attach to the top of the mounting top plate 25. They allow the delivery head 3 to reciprocate with the use of pillow block linear bearings 11 (FIGS. 2 and 3) that attach to the base plate 10 of the delivery head 3.

The individual tows that form the band 2 enter the delivery head 3 through a tow distributing section 13 that is composed of an entry comb mounting base 26 and the entry comb teeth 27. This section keeps the tows separated from each other so processing will be more workable in the delivery head 3. The entry comb base 26 and teeth 27 are attached to the side plates 8 and 9 as well as the top roller 28 and bottom roller 29. The rollers keep the band forming tows in the center plane for further processing.

The adjustable comb assembly 14 shown in FIG. 4 rotates about its mounting base 30. The swivel comb bracket 31 fits onto the pin 64 in the mounting base 30. The comb 36 is attached to 31 and rotates about pin 64 to establish a predetermined band width. The attachment bracket 32 is mounted to side plate 8 and supports the threads bushing 33. A threaded adjustment shaft 35 with knob 37 threads through the bushing 33 and threaded bushing 34, which is attached to the swivel comb bracket 31. Retaining means such as snap rings (not shown) on each side of the bushing 34 keep the bushing from moving off the shaft 35. As the adjustment shaft 35 is turned via knob 37, the comb 36 turns or swivels about its attachment point (pin 64) and changes the band width.

Once the width of the band 2 is set, the band enters the ribbonizer section 15 (FIGS. 2, 3 and 4). The individual tows forming the band 2 pass over the single ribbonizing tube 38 and the double ribbonizing tubes 39 and exit under the cold roller 43 in a serpentine path to blend the individual tows together and make a tape quality band 2. The ribbonizing tubes 38 and 39 are heated with the use of cartridge heaters 42 that are placed inside the ribbonizing tubes 38 and 39. The heated ribbonizing tubes are insulated from the side plates 8 and 9 with insulators 37 and 40. An attachment ring 41 clamps the insulator 40 that holds the ribbonizing tubes 39 to the side plate 8 for the double ribbonizer; and the single ribbonizing tube 38 is bolted through the insulator 37 into side plate 9. The double ribbonizing tubes 39 can be adjusted by rotating the attachment ring 41, thus changing the angle of the tubes 38 and 39 in relation to themselves for increasing or decreasing the pressure on the tows; this causes the flattening of the tows for intimate contact with each other and fusing of the tows into a high quality band (tape). The changing the angle of tubes 38 and 39 determines the amount of pressure to be applied to the tows which in turn determines the thickness to which the tows are flattened. The cold roller 43 cools the heated band 2 after it is formed to maintain the proper band width. It also helps to form a rigid band to assist with further processing requirements.

The formed tape band 2 then passes into the band add assembly 16. The drive roller 47 as shown in FIG. 4 is attached to the top side of mounting plate 49. The drive roller 47 is held in place to band guide tray 48 with attachment brackets 46. A coupling 45 connects the drive motor 44 to the drive roller 47. The motor itself attaches to the side plate 9. Guide 48 guides the band 2 into the cutting portion of the head. Pinch roller 53 of the add section 16 is mounted in attachment brackets 52 that are attached to pinch plate 51 to the mounting plate 49 with the attachment brackets 50. An air cylinder 55 is the actuation force for the pinching motion and is mounted to the head base plate 10 under the pinch plate 51. Pinch plate return mechanism 54 (a bolt with a spring) keeps the pinch plate pushed down to the air cylinder ram and supplies the return when the pinch is not required.

The cutting section 17 is next (FIG. 4). The cutter 17 includes a mounting body 56, an actuation cylinder 57, a top cutting blade 60 that mounts to a reciprocating mechanism 59 with linear bearings and ball rails 58, and a bottom blade 61. The top blade comes down and shears the band 2 between the top and bottom blades 60 and 61.

Band 2 is cut, when it is no longer desired, such as at the end of a winding circuit. Then it is added back in, when required, such as when the next circuit starts. The band is added through to compaction roller section 4. The compaction roller housing 62 is mounted to the front end of the deliver head 3 by bolting to the side plate 9 and has a mounting bracket 65 that holds the delivery roller 63 in the housing 62. The band 2 is guided around the under surface of the compaction roller 63 by means of a band biasing device 77 (FIG. 6) that is a curved deflector that has a contour parallel to the compaction roller 63 and offset from the compaction roller at a nominal clearance. Band 2 passes under the delivery roller 63 being guided by biasing device 77 and, it is placed onto the surface of the mandrel 5. The delivery roller 63 rides on the surface of the mandrel 5 on top of the band 2 and applies compaction force.

Figure 6:
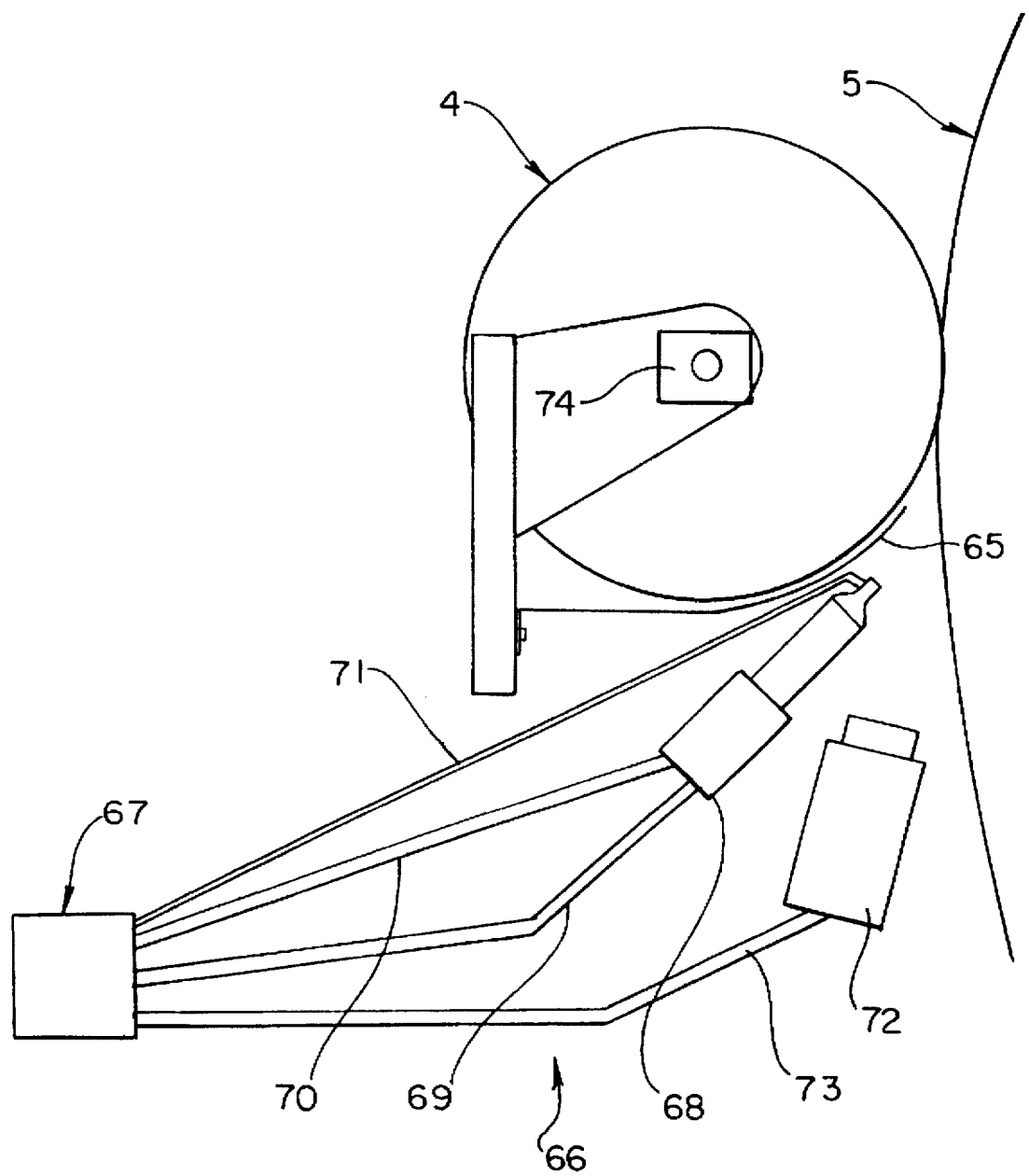
FIG. 6 is an isolated view of a preheat system for nip point heating of the band being laid on the mandrel surface.

As the band 2 is layed down onto the mandrel 5, optionally, a heat source 66 is provided at the nip point for heating the fiber being layed down and the underlying layer of fiber so that good consolidation of the layers will occur. As shown in FIG. 6 the air heater 68 heats the layer of resin impregnated fiber on the mandrel 5, or may heat the band 2 being fiber placed, or both. The heat source 66 is composed of nip-point heating controller 67 that regulates the temperature of the hot air from heater 68 by way of thermocouple 71, power supply line 70, air supply line 69, heat sensor 72 via control line 73. Temperature of the heated area is monitored by the infrared temperature sensor 72. Fiber speed is measured by the tachometer 74 as it is driven by the compaction roller 63. Additional process input is obtained by air temperature measuring thermocouples 71. Air flow through the heater 68 is controlled by the air flow and control devices 67. Temperature is maintained by varying the amount of power with the power control and regulating system 67.

Closed loop control is achieved by monitoring the temperature of the composite on the mandrel 5 with the infrared temperature sensor 72 temperature along with fiber speed as determined by the tachometer 74 are processed by the control 67. In addition to the above mentioned parameters of fiber temperature and speed, the computer determines what air flow and air temperature is required by assessing requirements of the process as input from the main fiber placement machine control computer 8.

Additional control is achieved by modeling the effect of heat on the composite resin. Excessive heat can cause areas of localized cure and of in extreme cases an exothermic reaction can result. Conversely insufficient heat to the fiber would not supply the required tack or compliance required to make a good part. As the temperature of the composite is a function of the difference in temperature between the air source and fiber being heated, as well as the length of time the temperature is applied, modeling is necessary to keep fiber temperature within required limits as the speed of the fiber varies.

Redundant regulation is accomplished by monitoring the temperature of the air leaving the heater with a thermocouple 71. Should the temperature rise too high for too long as pre-determined by operator experience, the process will be interrupted by a separate safety monitoring system (not shown).

Several of the components identified in this delivery head 3 may be coated with a synergistic coating (such as a Teflon coating) to assist with the durability and serviceability.

What is claimed:

1. A delivery head assembly for a fiber placement machine, having an input end for entry of a plurality of resin impregnated fibrous tows and an output end for applying superimposed layers of the tows in the form of a band in a helical pattern onto a mandrel to produce an article having varying contours, comprising:

a) distributing means being located at said input end of the delivery head assembly for receiving and spacing the tows in a single plane and feeding the tows inwardly in said assembly, b) ribbonizing means for spreading the tows to a desired width and thickness by heating and applying pressure, flattening the tows into intimate contact with one another and fusing the tows to each other, thus forming a quality tape band, c) chilling means for cooling the tape band coming from the ribbonizing means, d) cutting means for cutting complete across the tape in a single action while the delivery head assembly is in motion, e) add means upstream from said cutting means for holding said cut tape band and adding on demand to permit the application of tape band to the mandrel where desired, and f) compaction roller means for applying superimposed layers of the tape band onto the mandrel.

2. The delivery head assembly of claim 1 wherein the distributing means comprises an entry comb attached to side plates of the delivery head assembly and an adjustable comb attached to a mechanism that swivels the adjustable comb about an axis for changing the tows' band width as desired.

3. The delivery head assembly of claim 2 wherein the ribbonizing means comprises three tubes with heating means therein offset from each other in such a way so that the band passes over them in a serpentine path that can be adjusted for changing the amount of pressure on the tows that determines the thickness to which the tows are flattened.

4. The delivery head assembly of claim 1 wherein the delivery head assembly has a band biasing device adjacent to the compaction roller at a nominal distance therefrom for guiding the band around the compaction roller.

5. The delivery head assembly of claim 4 wherein the delivery head assembly includes a nip point heating means capable of heating the band as it is applied to a mandrel and heating the layers of a composite material already on the mandrel.

6. The delivery head assembly of claim 5 wherein the nip point heating means comprises a heating controller and a heat sensor capable of precisely controlling the temperature of the heat applied to the band and layers of composite material on the mandrel.

7. The delivery head assembly of claim 4 wherein the delivery head assembly includes a nip point heating means for heating the band as it is applied to a mandrel.

8. The delivery head assembly of claim 7 wherein the nip point heating means comprises a heating controller and a heat sensor for precisely controlling the temperature of the heat applied to band.

9. The delivery head assembly of claim 4 wherein the delivery head assembly includes a nip point heating means for heating the layers of a composite material already on the mandrel.

10. The delivery head assembly of claim 9 wherein the nip point heating means comprises a heating controller and a heat sensor for precisely controlling the temperature of the heat applied to the layers of a composite material already on the mandrel.

* * * * *